United States Patent
Horiuchi et al.

(10) Patent No.: US 11,784,520 B2
(45) Date of Patent: Oct. 10, 2023

(54) ROTOR STRUCTURE OF SYNCHRONOUS MOTOR

(71) Applicant: SANYO DENKI CO., LTD., Tokyo (JP)

(72) Inventors: Manabu Horiuchi, Tokyo (JP); Keisuke Nagata, Tokyo (JP)

(73) Assignee: SANYO DENKI CO., LTD., Tokyo (JP)

(*) Notice: Subject to any disclaimer, the term of this patent is extended or adjusted under 35 U.S.C. 154(b) by 105 days.

(21) Appl. No.: 17/478,200

(22) Filed: Sep. 17, 2021

(65) Prior Publication Data
US 2022/0103034 A1 Mar. 31, 2022

(30) Foreign Application Priority Data

Sep. 25, 2020 (JP) .................. 2020-160993

(51) Int. Cl.
*H02K 1/27* (2022.01)
*H02K 1/276* (2022.01)
*H02K 29/03* (2006.01)

(52) U.S. Cl.
CPC .......... *H02K 1/2766* (2013.01); *H02K 29/03* (2013.01); *H02K 2201/06* (2013.01); *H02K 2201/09* (2013.01)

(58) Field of Classification Search
CPC .. H02K 1/2766; H02K 29/03; H02K 2201/06; H02K 2201/09; H02K 1/2781; H02K 1/278; H02K 21/14; H02K 2213/03; H02K 1/16; H02K 1/246
See application file for complete search history.

(56) References Cited

U.S. PATENT DOCUMENTS

| | | | |
|---|---|---|---|
| 11,011,965 B2 | 5/2021 | Sasaki et al. | |
| 2015/0001980 A1* | 1/2015 | Zhang | H02K 21/16 |
| | | | 310/156.43 |
| 2018/0198333 A1* | 7/2018 | Ohori | H02K 21/14 |
| 2018/0219463 A1 | 8/2018 | Sasaki et al. | |
| 2020/0212738 A1* | 7/2020 | Kano | H02K 21/14 |

FOREIGN PATENT DOCUMENTS

| | | |
|---|---|---|
| JP | 61-280746 A | 12/1986 |
| JP | 2004-242424 A | 8/2004 |
| JP | 2015-216716 A | 12/2015 |
| JP | 2015-231254 A | 12/2015 |

(Continued)

OTHER PUBLICATIONS

Japanese Office Action (JPOA) dated Aug. 31, 2021 for corresponding Japanese Patent Application No. 2020-160993.

(Continued)

*Primary Examiner* — Thomas Truong
(74) *Attorney, Agent, or Firm* — Rankin, Hill & Clark LLP

(57) ABSTRACT

A rotor structure of a synchronous motor includes: a stator; and a rotatable rotor on the inner side of the stator, in which the rotor includes: a rotor core fixed to a rotary shaft; and a permanent magnet on the outer side of the rotor core, the permanent magnet on the outer side of the rotor core includes a main magnet and an auxiliary magnet, the auxiliary magnet is provided in contact with the outer side of the rotor core, and the main magnet is provided in contact with the outer side of the auxiliary magnet.

8 Claims, 5 Drawing Sheets

(56) References Cited

FOREIGN PATENT DOCUMENTS

| | | |
|---|---|---|
| JP | 2018-522524 A | 8/2018 |
| JP | 2020-78176 A | 5/2020 |

OTHER PUBLICATIONS

Extended European Search Report (EESR) dated Feb. 8, 2022 for corresponding European Patent Application No. 21197137.9.
Mizutani et al., "Optimum Design Approach for Low Speed, High Torque Permanent Magnet Motors", T.IEE Japan, 2000, vol. 120-D, No. 3, pp. 328-335, Total 9 pages; Cited in Specification; Partial English translation.

* cited by examiner

ROTOR STRUCTURE OF SYNCHRONOUS MOTOR

CROSS-REFERENCE TO RELATED APPLICATION

This application is based on Japanese Patent Application No. 2020-160993 filed with the Japan Patent Office on Sep. 25, 2020, the entire content of which is hereby incorporated by reference.

BACKGROUND

1. Technical Field

An aspect of the present disclosure relates to a rotor structure of a synchronous motor.

2. Description of the Related Art

In known cases, there are three patterns known as representative structures of a rotor in a surface permanent magnet synchronous motor (Surface Permanent Magnet Synchronous Motor, hereinafter abbreviated to "SPMSM") where a permanent magnet is affixed to the surface of a rotor among synchronous motors.

In the first pattern, a C-shaped permanent magnet is affixed onto the perimeter of a shaft or rotor core having a circular cross section. The C-shaped permanent magnet is processed into a shape formed with a plurality of different curvature radii including a small curvature radius on the outer side and a large curvature radius on the inner side as viewed in cross section of a rotary shaft (the same shall apply below).

In the second pattern, for example, a D-shaped permanent magnet including an outer surface with a constant curvature radius about a rotary shaft and a bottom surface processed to be flat is affixed to each side of the perimeter of a rotor core having a substantially square cross section, the rotor core being mounted on the rotary shaft. In this case, the rotor core is often produced by laminating magnetic steel sheets.

In the third pattern, an annular permanent magnet called a ring magnet is affixed to a shaft or rotor core having a circular cross section. The structure in this pattern is known as a structure that is very simple, easy to be produced, and highly reliable. These patterns are not necessarily perfect in terms of motor performance. However, according to all of these patterns, production, positioning, and the like are easy, and reasonable performance can be exhibited. In addition, the cost is low. Hence, these patterns are widely used as practical choices.

On the other hand, some cases are being studied to further improve the motor performance.

For example, Non-patent Literature 1, Ryoji Mizutani and Nobuyuki Matsui. "Optimum Design Approach for Low Speed, High Torque Permanent Magnet Motors." IEEJ Transactions on Industry Applications, vol. 120, no. 3 (Mar. 1, 2000): 328-335, is known. This literature examines various permanent magnet shapes. Especially, a magnet that is convex toward a rotor core, that is, a main shaft and has an inverted R shape with a smaller curvature radius on the inner side than on the outer side has been proposed as an example where performance can be improved.

Moreover, in a technology described in JP-A-2015-231254, a permanent magnet is magnetized in such a manner as to focus magnetic flux to an arbitrary focus point set on a pole center line and radially outside a rotor. The shape of a cross section, taken along a plane perpendicular to the axial direction, of a permanent magnet-side adhesion surface being an adhesion surface of the permanent magnet to the rotor is an arc-shaped protrusion. Furthermore, the shape of a corresponding cross section of a rotor core-side adhesion surface being an adhesion surface of the rotor core to the permanent magnet is an arc-shaped recessed groove. The permanent magnet-side adhesion surface and the rotor core-side adhesion surface $31a$ have shapes fitting into each other. Furthermore, the orientation direction of a permanent magnet is set in such a manner as to be normal to the permanent magnet-side adhesion surface and to a tangent T on the rotor core side, passing through a contact P. JP-A-2015-231254 proposes that a magnet having reverse radial orientation (concentrated orientation) has a shape as in the above-mentioned known cases.

In all of these examples, a deformed elliptical magnet is used. In other words, a permanent magnet has a shape that curves both outward and inward as viewed from the rotary shaft in a radiation direction.

If a permanent magnet is used for a rotor, firstly, a circumferential length of the magnet is restricted. In other words, when a C-shaped magnet is taken as an example, the width of the magnet, the central angle occupied by half a magnet of one pole, and the inside diameter dimension of the magnet are determined. In terms of this, if an increase in the size of the permanent magnet is attempted to increase the torque of a motor, that is, if the thickness and width of the permanent magnet are increased, limit values thereof are determined in such a manner that a point to be a corner on the inner side of the permanent magnet is not placed beyond a line subtending the central angle.

This is because another permanent magnet is affixed adjacent to the permanent magnet. If the width of the permanent magnet is increased, the point to be the corner on the inner side of the permanent magnet interferes with the adjacent permanent magnet. Accordingly, a conceivable way to prevent the interference is, for example, to increase the inside diameter of the rotor core, that is, reduce the thickness of the permanent magnet. Conversely, if the thickness of the permanent magnet is increased, that is, if the inside diameter of the rotor core is reduced, the interference of the point to be the corner on the inner side of the permanent magnet occurs similarly. Accordingly, a conceivable way is to reduce the width of the permanent magnet is conceivable.

In this manner, the width and thickness of the permanent magnet are in a trade-off relationship, which indicates there is a limit to an increase in torque generated by increasing the volume of permanent magnet and increasing the amount of magnetic flux. In contrast, commercialization is under way by, for example, chamfering a corner portion at the point to be the corner on the inner side of the permanent magnet and accordingly increasing the width of the permanent magnet. It is not that there is no design idea about an increase in the volume of permanent magnet for the commercialization.

In terms of this, a permanent magnet that curves inward and outward such as disclosed in JP-A-2015-231254 and Non-patent Literature 1, which are mentioned above, is expected as a magnet that can avoid the constraints of the above trade-off, and encourage an increase in the amount of magnetic flux, that is, an increase in torque.

However, in a case of a mass-produced synchronous motor using a permanent magnet, productivity, and yield or accuracy are both considered. The elliptical shape has no bottom surface to serve as a reference for processing. Accordingly, it is difficult to apply a method suitable for mass production, such as grinding with a grindstone, to a deformed elliptical magnet. Hence, in reality, the magnets disclosed in the above-mentioned literatures are unlikely to be employed, for example, because the degree of difficulty of producing the permanent magnet itself is high, and because although the deformed elliptical magnet can be produced by a method such as wire cutting, it is difficult to secure productivity.

Furthermore, in the above technologies, it is difficult to identify a reference for the affixation of the permanent magnet when the permanent magnet is affixed to the shaft or rotor core. Hence, accuracy is reduced due to, for example, mispositioning upon affixation, which has adverse effects on cogging torque and torque ripple of the finished synchronous motor. A conceivable way to prevent the adverse effects is to accept a reduction in productivity and perform precise positioning. However, this is not a practical solution.

SUMMARY

A rotor structure of a synchronous motor includes: a stator; and a rotatable rotor on the inner side of the stator, in which the rotor includes: a rotor core fixed to a rotary shaft; and a permanent magnet on the outer side of the rotor core, the permanent magnet on the outer side of the rotor core includes a main magnet and an auxiliary magnet, the auxiliary magnet is provided in contact with the outer side of the rotor core, and the main magnet is provided in contact with the outer side of the auxiliary magnet.

DETAILED DESCRIPTION

Figure 1A:
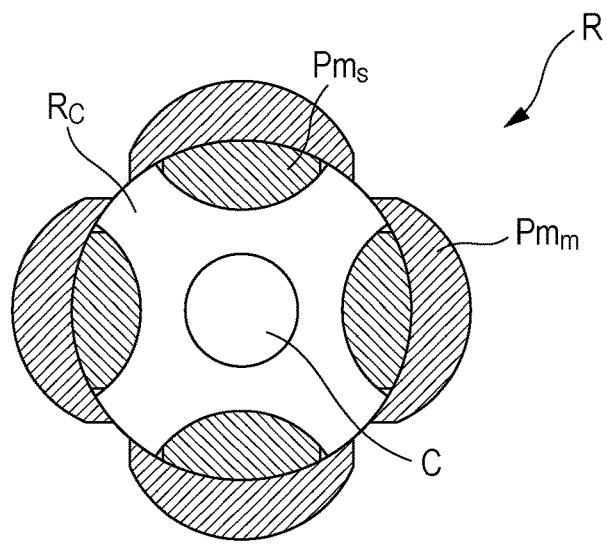
FIGS. 1A to 1C are cross-sectional views illustrating a rotor according to embodiments of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide the following rotor structure of a synchronous motor using a permanent magnet. The rotor structure of the synchronous motor includes the permanent magnet structure and placement that increases motor performance and increases accuracy and mass productivity.

A rotor structure of a synchronous motor according to an embodiment of the present disclosure includes: a stator; and a rotatable rotor on the inner side of the stator, in which the rotor includes: a rotor core fixed to a rotary shaft; and a permanent magnet on the outer side of the rotor core, the permanent magnet on the outer side of the rotor core includes a main magnet and an auxiliary magnet, the auxiliary magnet is provided in contact with the outer side of the rotor core, and the main magnet is provided in contact with the outer side of the auxiliary magnet.

Moreover, the auxiliary magnets may be embedded in a plurality of indentations or holes in the perimeter of the rotor core.

Furthermore, the shapes of the main magnet and the auxiliary magnet may be different from each other.

In addition, the materials of the main magnet and the auxiliary magnet may be different from each other.

In addition, the main magnet may have a ring-shaped cross section.

In addition, the auxiliary magnet may be a diffusion orientation magnet where magnetic flux diffuses toward a surface of an arc.

Further, cross sections, which are orthogonal to an axis of the rotary shaft, of the rotor may include a cross section having only the main magnet of the permanent magnet, and a cross section having both of the main magnet and the auxiliary magnet. Moreover, the rotor may include a plurality of steel sheets laminated in an axial direction of the rotary shaft.

According to the above-mentioned aspect of the present disclosure, it is possible to provide the following rotor structure of a synchronous motor using a permanent magnet. The rotor structure includes the structure and placement of a permanent magnet that increases motor performance and increases accuracy and mass productivity.

FIGS. 1A to 1C and 2A and 2B are cross-sectional views illustrating a rotor according to embodiments of the present disclosure. Moreover, FIG. 2C is a cross-sectional view for explaining constraints on the dimensions of a magnet of a general rotor for the purpose of comparison.

All the drawings illustrate a stator S, a rotor R, a rotor core $R_c$, a permanent magnet Pm, a main magnet $Pm_m$, an auxiliary magnet $Pm_s$, and a main shaft C, which are components of a synchronous motor M (refer to FIG. 6), using in common reference numerals with leaders.

First Embodiment

FIG. 1A illustrates a cross-sectional view according to an embodiment representing the present disclosure, and describes the structure of the rotor below.

The synchronous motor M includes the stator S, and the rotatable rotor R that is placed on the inner side of the stator S. The rotor R includes the rotor core $R_c$ fixed to the main shaft C being a rotary shaft, and the permanent magnets Pm installed on the outer side of the rotor core $R_c$. The permanent magnets Pm include the main magnets $Pm_m$ and the auxiliary magnets $Pm_s$. The auxiliary magnet $Pm_s$ is provided in such a manner as to touch the outer side of the rotor core $R_c$. The main magnet $Pm_m$ is provided in such a manner as to touch the outer side of the auxiliary magnet $Pm_s$.

The rotor core $R_c$ mounted on the main shaft (shaft) C, which is the rotary shaft, of the synchronous motor M has a given radius r. A total of four main magnets $Pm_m$ configuring the permanent magnets Pm are joined to the perimeter of the rotor core $R_c$ at intervals of 90 degrees around the main shaft C. The main magnet $Pm_m$ has a known substantially C-shape in cross section, and includes an inner surface having a curvature radius 5 (refer to FIG. 2C) about the main shaft C.

The curvature radius 5 on the inner surface side of the main magnet Pm$_m$ equals the radius r of the rotor core R$_c$. A width 1 of the permanent magnet Pm is designed to extend to a limit position described below.

The rotor core R$_c$ is provided on the inner surface side, that is, at the back of each main magnet Pm$_m$ with an indentation or hole (hereinafter referred to as the "indentation, etc. L" (refer to FIG. 3B)) that curves in the direction of the main shaft C as viewed from the inner surface side in such a manner as to coincide with a center portion of the main magnet Pm$_m$ in the circumferential direction. Furthermore, a total of four auxiliary magnets Pm$_s$ are placed, embedded in the indentations, or the like L, respectively, in such a manner as to touch the outer side of the rotor core R$_c$. In other words, the auxiliary magnets Pm$_s$ are embedded in a plurality of the indentations, etc. L provided in the perimeter of the rotor core R$_c$.

The outer surface side of the auxiliary magnet Pm$_s$ is formed into an arc having a curvature radius equal to the radius r of the rotor core R$_c$ and to the curvature radius 5 on the inner surface side of the main magnet Pm$_m$. The outer surface side of the auxiliary magnet Pm$_s$ is provided in such a manner as to be flush with the outer surface of the rotor core R$_c$. This structure allows the outer surface side of the auxiliary magnet Pm$_s$ configuring the permanent magnet Pm to be affixed to the inner surface side of the main magnet Pm$_m$ in such a manner as to substantially fit and touch the inner surface side of the main magnet Pm$_m$.

As a method used to affix the permanent magnets Pm, the main magnets Pm$_m$, the auxiliary magnets Pm$_s$, the rotor core R$_c$, and the like, bonding with, for example, an adhesive is used in many cases. However, as long as a method in which they can be fixed with strength that endures the use of the synchronous motor M is used, not all the contact surfaces may be fixed. Alternatively, any other method different from bonding with, for example, an adhesive may be used.

As mentioned above, the permanent magnet Pm includes a pair of the main magnet Pm$_m$ and the auxiliary magnet Pm$_s$. In the embodiment, positioning during production is taken into consideration, and the widths of the main magnet Pm$_m$ and the auxiliary magnet Pm$_s$ are set as follows. The length called "width" below may indicate the arc length on the circumference of the rotor core R$_c$ if necessary.

In other words, the width 1 (refer to FIG. 2C) of the main magnet Pm$_m$ of the permanent magnet Pm is set to be greater than the width of the indentation, or the like L of the rotor core R$_c$, that is, the width of the auxiliary magnet Pm$_s$, and is set in such a manner that both ends of the width of the main magnet Pm$_m$ touch the rotor core R$_c$. This is because it makes it possible to stably place the main magnets Pm$_m$ on the outer surface of the rotor core R.

In the embodiment, the shape of the permanent magnet Pm is not limited to the illustrated shape. It is needless to say that a permanent magnet of the same shape as the permanent magnet Pm, a permanent magnet of a shape different from the permanent magnet Pm, and a permanent magnet of an appropriate shape can be used as the permanent magnet Pm. In this respect, the permanent magnet Pm includes the main magnet Pm$_m$ and the auxiliary magnet Pm$_s$, which enables combinations of various shapes of the main magnet Pm$_m$ and the auxiliary magnet Pm$_s$. Therefore, the degree of freedom in the electromagnetic shape and placement of the permanent magnet Pm is increased. The main magnet Pm$_m$ and the auxiliary magnet Pm$_s$ may have shapes different from each other.

Moreover, in terms of the material of the permanent magnet Pm, which does not influence the placement thereof, any material can be used. Even magnets that are inexpensive and relatively easy to obtain material thereof, for example, magnets using heavy rare earth such as neodymium and samarium, cobalt magnets, and ferrite magnets, can be selected and used appropriately as the material of the permanent magnet Pm. The materials of the main magnet Pm$_m$ and the auxiliary magnet Pm$_s$ may be different from each other.

FIG. 2C is a cross-sectional view for explaining constraints on the dimensions of a magnet of a general rotor for the purpose of comparison. The above embodiment of the present disclosure is described with reference to FIG. 2C. FIG. 2C illustrates the width 1 of the permanent magnet Pm, an angle 2 being half the angle of a circumference around the main shaft C, which is occupied by one pole of the permanent magnet Pm, and the curvature radius 5 on the inner surface side of the permanent magnet as the dimensions of the C-shaped permanent magnet.

If an attempt to increase the size of the permanent magnet Pm is made to increase the torque of the synchronous motor M, that is, if an attempt to increase a thickness 3 of the permanent magnet Pm and the width 1 of the permanent magnet Pm is made, limit values thereof are determined in such a manner that a point 4 to be an end (corner) on the inner surface side of the permanent magnet Pm is not placed beyond a line subtending the angle 2.

This is because another permanent magnet Pm is affixed adjacent to the permanent magnet Pm. If the width 1 of the permanent magnet Pm is increased, the point 4 interferes with the adjacent permanent magnet. Accordingly, a conceivable way to prevent the interference is to increase the curvature radius 5 on the inner surface side of the permanent magnet, that is, to reduce the thickness 3 of the permanent magnet. Conversely, if the thickness 3 of the permanent magnet Pm is increased, that is, if the curvature radius 5 on the inner surface side of the permanent magnet is reduced, the interference of the point 4 occurs similarly. Hence, a conceivable way is to reduce the width 1 of the permanent magnet. In other words, the width and the thickness 3 of the permanent magnet Pm are in a trade-off relationship. Therefore, there is a limit to the extent to which the volume of permanent magnet is increased to increase the amount of magnetic flux and thus increase the amount of torque generated.

However, in the above-mentioned embodiment of the present disclosure, a pair of permanent magnets including the main magnet Pm$_m$ and the auxiliary magnet Pm$_s$ is used as the permanent magnet Pm. Consequently, it is possible to promote an increase in torque generated by the auxiliary magnet Pm$_s$ placed at the back of the main magnet Pm$_m$ while the main magnet Pm$_m$ accepts the above-mentioned constraints on the dimensions of the magnet of the rotor.

At this point in time, a bottom surface corresponding to the inner surface side of the main magnet Pm$_m$ of the permanent magnet Pm is an arc surface having the same radius as the radius r of the rotor core R$_c$ and as the fixed curvature radius 5. Hence, it is possible to easily set a processing reference upon production for the main magnet Pm$_m$ of the permanent magnet Pm.

Moreover, a top surface corresponding to the outer surface side of the auxiliary magnet Pm$_s$ of the permanent magnet Pm is also an arc surface having the same radius as the radius r of the rotor core R$_c$ and as the fixed curvature radius 5. Hence, it is possible to easily set a processing reference upon production as in the main magnet Pm$_m$ of the permanent magnet Pm.

In this manner, according to the embodiment of the rotor structure of the present disclosure, it is possible to increase the torque of the synchronous motor M and easily form the permanent magnet Pm that is difficult to produce, process, and position. Therefore, it is possible to produce the permanent magnet Pm and the rotor R at low cost.

Second Embodiment

Figure 1B:
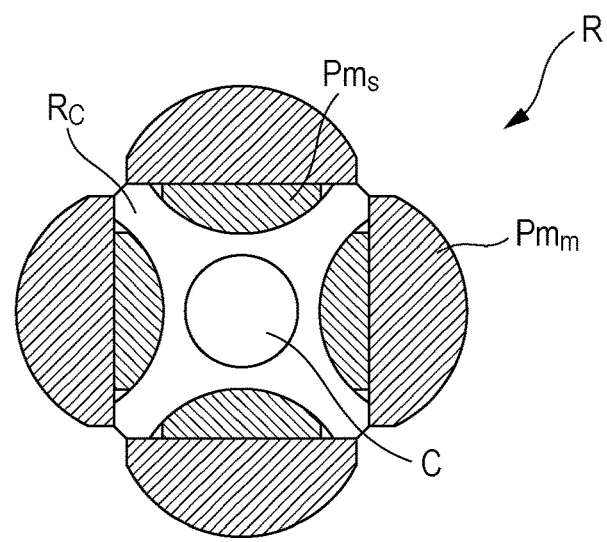

In a second embodiment illustrated in FIG. 1B, the shape of the rotor core $R_c$ is substantially square in contrast to the above first embodiment.

The rotor core $R_c$ mounted on the main shaft C of the synchronous motor M has a substantially square shape. Four sides of the rotor core $R_c$ configure straight lines orthogonal to lines extending in the radial direction from the main shaft C. A total of four main magnets $Pm_m$ configuring the permanent magnets Pm are joined to the sides of the rotor core $R_c$, respectively, that is, at intervals of 90 degrees around the main shaft C. The main magnet $Pm_m$ has a known substantially D-shape in cross section, and includes an inner surface that touches one of the four sides of the rotor core $R_c$. The width of the main magnet $Pm_m$ is designed to extend to the limit position as mentioned above.

The rotor core $R_c$ is provided on the inner surface side, that is, at the back of each main magnet $Pm_m$ with an indentation, etc. that curves in the direction of the main shaft C as viewed from the inner surface side in such a manner as to coincide with the center portion of the main magnet $Pm_m$ in the circumferential direction. Furthermore, a total of four auxiliary magnets $Pm_s$ are placed in the indentations, respectively.

The outer surface side of the auxiliary magnet $Pm_s$ is formed in a straight line that fits and touches the side of the rotor core $R_c$, and is formed in such a manner as to fit and touch a straight portion on the inner surface side of the main magnet $Pm_m$. The outer surface side of the auxiliary magnet $Pm_s$ is provided in such a manner as to be flush with the outer surface of the rotor core $R_c$. This structure allows the outer surface side of the auxiliary magnet $Pm_s$ configuring the permanent magnet Pm to be affixed to the inner surface side of the main magnet $Pm_m$ in such a manner as to substantially fit the inner surface side of the main magnet $Pm_m$.

In this embodiment, the main magnet $Pm_m$ of the permanent magnet Pm is formed to be larger than the auxiliary magnet $Pm_s$. In terms of this, the main magnet $Pm_m$ and the auxiliary magnet $Pm_s$ may be formed to have the same size, and placed on top of each other.

The rest of the configuration is the same as that of the above-mentioned first embodiment. Descriptions are omitted below where there is no difference in the configuration unless there are special circumstances.

According to the embodiment, one side surface of each of the main magnet $Pm_m$ and the auxiliary magnet $Pm_s$ of the permanent magnet Pm is formed in a straight line. Hence, the production, processing, and positioning of the permanent magnet Pm can be performed more easily than in the above-mentioned first embodiment, and therefore, the permanent magnet Pm and the rotor R can be produced at low cost. Moreover, a laminated plate portion where the permanent magnet Pm, the main magnet $Pm_m$, or the auxiliary magnet $Pm_s$ is not present can also be formed on the rotor core $R_c$ that uses a laminate in many cases. In this case, a laminated plate surface where the permanent magnet Pm is not present contributes to positioning in the axial direction for embedding the permanent magnet Pm, and adds another positioning surface to the indentation, etc. L. Therefore, the permanent magnet Pm and the like are affixed more easily since more surfaces to serve as bonding references are formed.

Third Embodiment

Figure 1C:
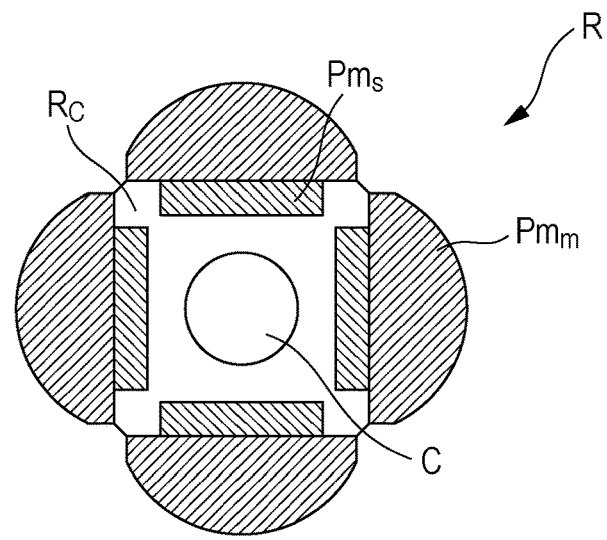

In a third embodiment illustrated in FIG. 1C, a magnet including a substantially cuboid plate structure in cross section is employed as the auxiliary magnet $Pm_s$ in the above-mentioned second embodiment. The substantially cuboid plate structure in cross section indicates a cross-sectional structure of the auxiliary magnet $Pm_s$. The auxiliary magnet $Pm_s$ can also be a cuboid that is continuous in the axial direction of the main shaft C. In the embodiment, the structure of the auxiliary magnet $Pm_s$ is simple. Accordingly, it is possible to produce, process, and position the permanent magnet Pm more easily. Therefore, it is possible to produce the permanent magnet Pm and the rotor R at low cost.

Fourth Embodiment

Figure 2A:
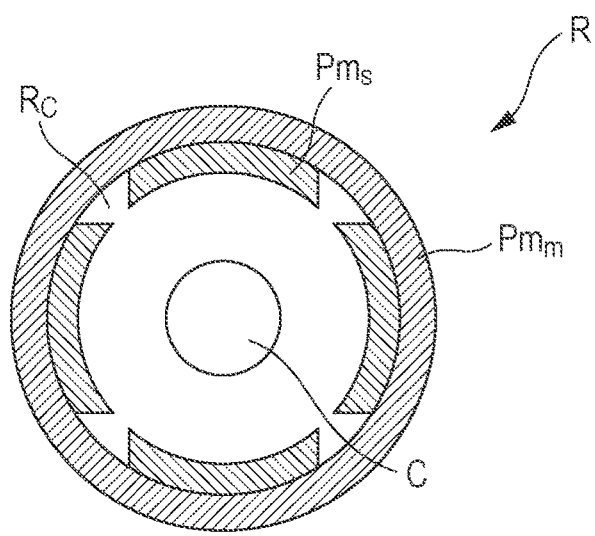
FIGS. 2A and 2B are cross-sectional views illustrating the rotor according to the embodiments of the present disclosure.

A fourth embodiment illustrated in FIG. 2A is an example where the main magnet $Pm_m$ of the permanent magnet Pm is an annular magnet concentric with the rotor core $R_c$ in contrast to the above-mentioned first to third embodiments.

The rotor core $R_c$ mounted on the main shaft C of the synchronous motor M has a given radius r. The main magnet $Pm_m$, which has a known annular (ring) shape with a given thickness, of the permanent magnet Pm is fitted around the rotor core R.

In this embodiment, there is only one pattern in the placement of the main magnets $Pm_m$ of the permanent magnet Pm. Accordingly, only the placement of the auxiliary magnets $Pm_s$ is important. In this example, the rotor core $R_c$ is provided on the inner surface side, that is, at the back of the main magnet $Pm_m$ with an independent indentation or hole (indentation, etc.) recessed with a given depth on and along the outer surface side of the rotor core $R_c$ that draws an arc about the main shaft C and coincides with the inner surface side of the main magnet $Pm_m$. A total of four auxiliary magnets $Pm_s$ are embedded in the indentations, etc., respectively, and placed in such a manner as to touch the main magnet $Pm_m$ and the rotor core $R_c$. In other words, the total of four auxiliary magnets $Pm_s$ are joined to the main magnet $Pm_m$ at intervals of 90 degrees around the main shaft C.

The curvature radius 5 on the outer surface side of the auxiliary magnet $Pm_s$ equals the radius r of the rotor core $R_c$ and the curvature radius of the inner surface side of the main magnet $Pm_m$ of the rotor core $R_c$. On the other hand, the inner surface side of the auxiliary magnet $Pm_s$ curves in a direction opposite to the main shaft C and has a curvature radius that is smaller by the thickness of the auxiliary magnet $Pm_s$.

In the rotor R of the embodiment, firstly, the auxiliary magnets $Pm_s$ are embedded in the rotor core $R_c$. Next, the outer surfaces of the rotor core $R_c$ and the auxiliary magnets $Pm_s$ are formed to be flush. The rotor core $R_c$ where the auxiliary magnets $Pm_s$ are embedded is then fitted into the main magnet $Pm_m$, which has an annular (ring) shape in cross section with a given thickness, of the permanent magnet Pm. As a result, the rotor R is formed.

According to the embodiment, a wide space is created between the main shaft C and the auxiliary magnet $Pm_s$. Hence, the size of the entire synchronous motor M can be reduced. Moreover, the thick auxiliary magnet $Pm_s$ is provided, making use of the space; accordingly, the degree of freedom related to the setting of torque of the synchronous motor M can be increased.

Fifth Embodiment

Figure 2B:
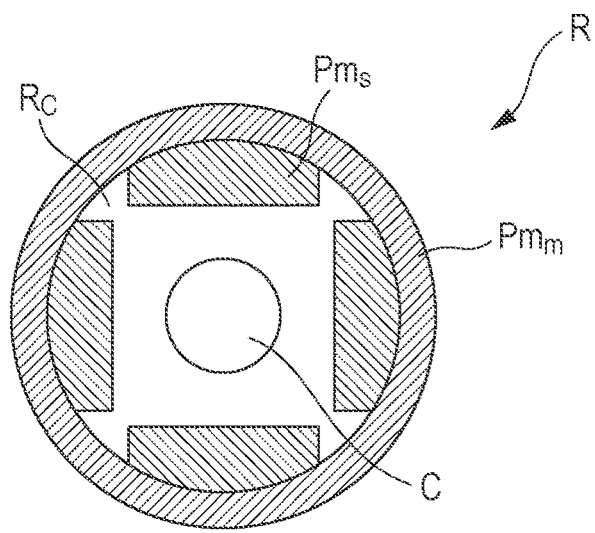
Figure 2C:
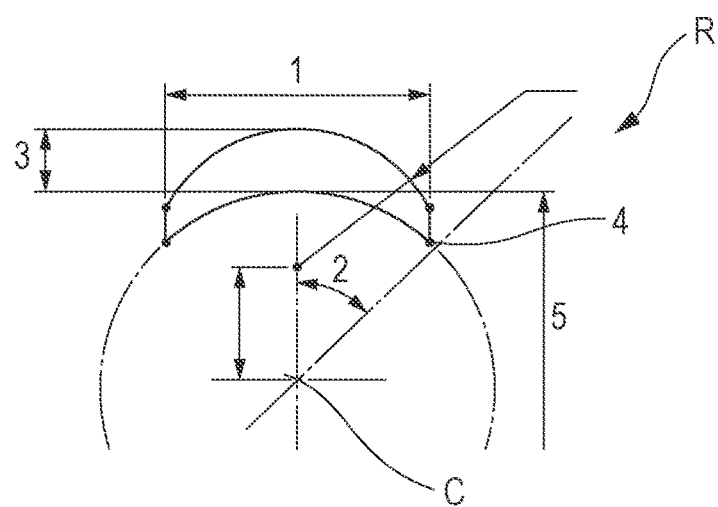
FIG. 2C is a cross-sectional view for explaining constraints on the dimensions of a magnet.

A fifth embodiment illustrated in FIG. 2B is an example where the main magnet $Pm_m$ of the permanent magnet Pm is an annular magnet concentric with the rotor core $R_c$ as in the fourth embodiment illustrated in FIG. 2A.

In the embodiment, the rotor core $R_c$ is provided on the inner surface side, that is, at the back of the main magnet $Pm_m$ with an independent recessed indentation or hole (indentation, etc.). Each of the indentations, etc. includes an outer surface side that draws an arc about the main shaft and coincides with the inner surface side of the main magnet $Pm_m$, and an inner surface side formed in a straight line orthogonal to a line extending in the radial direction from the main shaft C. A total of four auxiliary magnets $Pm_s$ are placed, embedded in the indentations, etc., respectively. In other words, the total of four auxiliary magnets $Pm_s$ are joined to the main magnet $Pm_m$ at intervals of 90 degrees around the main shaft C.

According to the embodiment, the auxiliary magnet $Pm_s$ larger than that of the above-mentioned fourth embodiment can be employed. Therefore, the torque of the synchronous motor M can be further increased.

Another Embodiment

An embodiment of the rotor core $R_c$ to which the above-mentioned embodiments of the present disclosure are applied is described below.

Figure 3A:
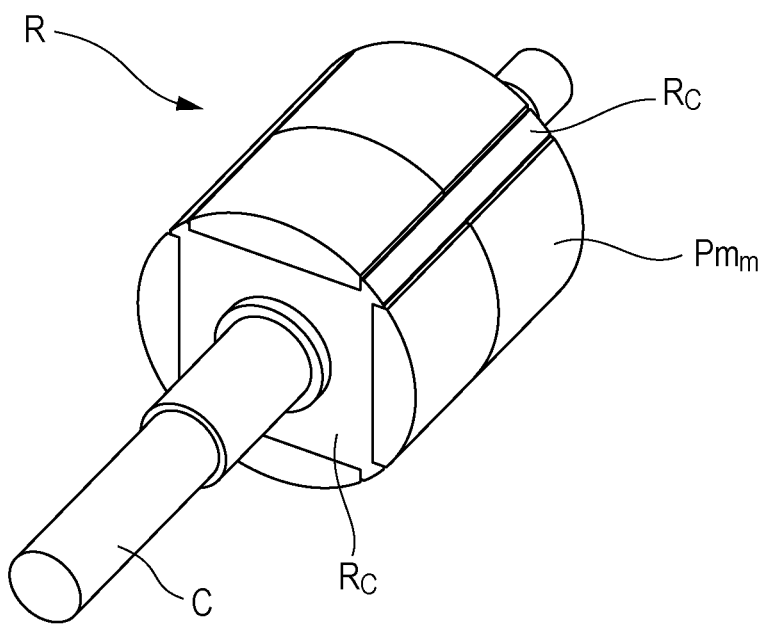
FIGS. 3A and 3B are perspective views illustrating the external appearance of a rotor core of the rotor according to the embodiments of the present disclosure.
Figure 3B:
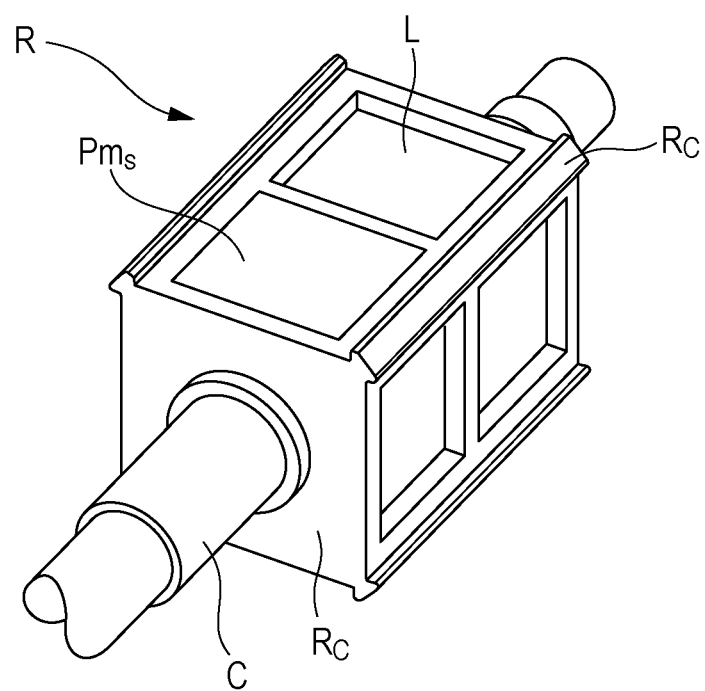

FIGS. 3A and 3B illustrate an example of the rotor core $R_c$ formed by laminating magnetic steel sheets. In other words, the rotor R illustrated in FIGS. 3A and 3B includes a plurality of steel sheets laminated in the axial direction of the main shaft C being a rotary shaft. FIG. 3A illustrates an external appearance in an example using the above-mentioned third embodiment, as a representative example. FIG. 3B illustrates an external appearance where the main magnets $Pm_m$ of the permanent magnet Pm have been removed.

As illustrated in FIG. 3A, the rotor core $R_c$ has an external appearance that looks like including only normal D-shaped permanent magnets Pm. The main magnets $Pm_m$ according to the third embodiment, which configure the permanent magnets Pm, are removed, which reveals the auxiliary magnets $Pm_s$ embedded in the rotor core $R_c$ as illustrated in FIG. 3B. Consequently, the volume of permanent magnet can be increased as compared to a synchronous motor using the normal D-shaped permanent magnet Pm. Hence, a synchronous motor having high torque can be obtained. As mentioned above, the permanent magnet Pm can be easily, for example, produced and positioned.

Moreover, in FIG. 3B, two slot-shaped indentations, etc. L for placing the plate-shaped auxiliary magnet $Pm_s$ of the permanent magnet Pm are provided across a portion without the indentation, etc. L as viewed along a direction of the main shaft C. This structure allows maintaining and increasing the stiffness of the rotor core $R_c$. Moreover, as a result, this embodiment also allows adjusting the volume of the permanent magnet Pm.

In this case, in terms of the slot-shaped indentation, etc. L, the surface viewed in the direction of the main shaft C, and the surface viewed in the circumferential direction, of the indentation, etc. L of the laminated plate have the function of positioning upon embedding the auxiliary magnet $Pm_s$ of the permanent magnet Pm. Therefore, the rotor structure with high accuracy and mass productivity can be obtained. In the embodiment, the rotor core $R_c$ includes the laminated plate. However, it is needless to say that the rotor core $R_c$ exerts a similar function even if being integrally formed by die casting or other methods.

Furthermore, although not illustrated, a portion where the magnet is placed and a portion where the magnet is not placed may be placed alternately over one or more sheets of the laminated plate. Alternatively, three or more slot-shaped indentations such as described above may be provided. In this manner, the structure of the rotor core $R_c$ is arbitrary. Therefore, the rotor structure with a high degree of freedom can be obtained if necessary in terms of electromagnetics.

Figure 4:
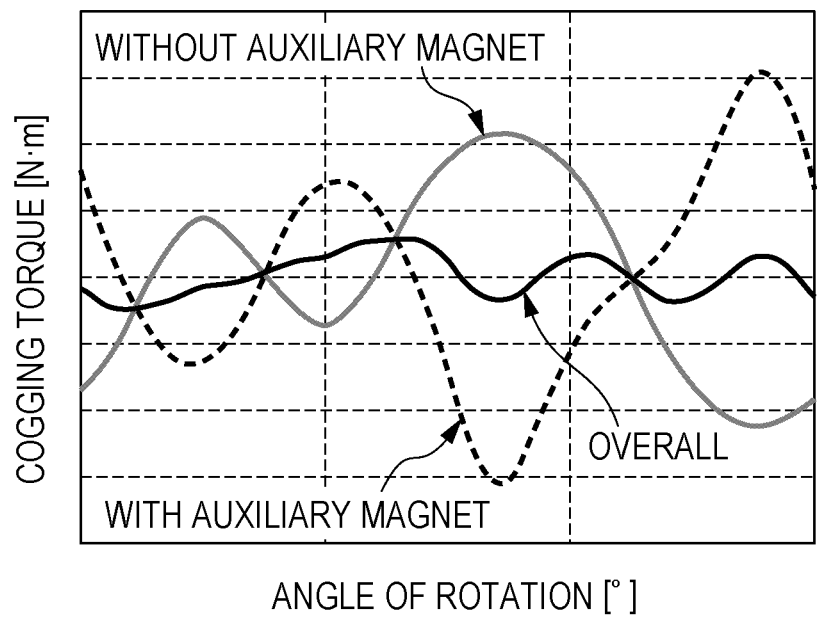
FIG. 4 is a diagram illustrating the change of cogging torque in the rotor core illustrated in FIGS. 3A and 3B.

In this manner, cross sections, which are orthogonal to an axis of the main shaft C, of the rotor R may include a cross section having only the main magnet $Pm_m$ of the permanent magnet Pm and a cross section having both of the main magnet $Pm_m$ and the auxiliary magnet $Pm_s$. FIG. 4 illustrates the waveforms of cogging torque in cross sections of places with and without the auxiliary magnet $Pm_s$ (auxiliary permanent magnet) illustrated in FIGS. 3A and 3B. A comparison of the waveforms in FIG. 4 shows that a position where torque appears in the positive direction and a position where torque appears in the negative direction are increasingly displaced. This is because in a magnetic circuit having a loop path where magnetic flux on the rotor side passes through the stator and returns to the rotor, the state of a magnetic circuit network including a magnetomotive force by the permanent magnet, magnetic resistance of the rotor core, and magnetic resistance of the permanent magnet varies depending on the presence or absence of the auxiliary permanent magnet.

Such a characteristic where a phase difference occurs in cogging pulsation is used to combine the portions with and without the auxiliary permanent magnet in the axial direction at a certain ratio as illustrated in FIGS. 3A and 3B. In terms of the cogging torque of the entire rotor R, a sum of the product of the waveform of the portion with the auxiliary permanent magnet and the ratio in the axial direction in this portion, and the product of the waveform of the portion without the auxiliary permanent magnet and the ratio in the axial direction in this portion is a composite waveform as a whole. Consequently, it is understood that the ratio of combination is selected appropriately, and accordingly, pulsation of the composite waveform can be cancelled.

Still Another Embodiment

Figure 5:
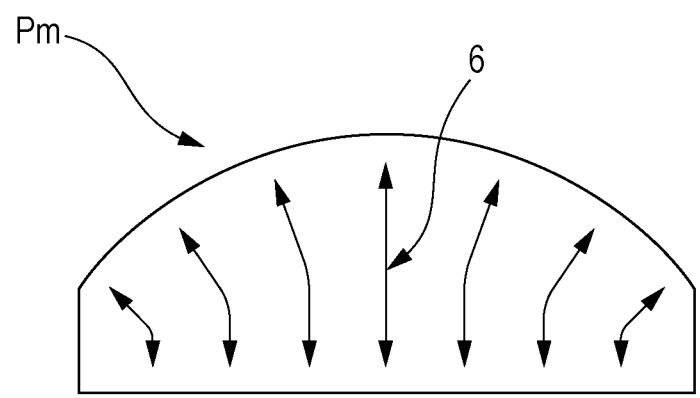
FIG. 5 is a cross-sectional view illustrating a permanent magnet of the rotor according to another embodiment of the present disclosure.

FIG. 5 illustrates an example of the main magnet $Pm_m$ of the permanent magnet Pm, which can be applied to part of the above-mentioned embodiments of the present disclosure.

FIG. 5 illustrates an example of a diffusion orientation permanent magnet (diffusion orientation magnet) where magnetic flux diffuses toward a surface of an arc. The permanent magnet is broadly divided into isotropy where internal magnetic flux 6 is oriented randomly, and anisotropy where the direction of the internal magnetic flux 6 is restricted in a specific direction. Furthermore, there are types of anisotropy including radial anisotropy where the orientation direction is the radial direction toward the circumference, parallel anisotropy where the orientation directions are aligned parallel, and polar anisotropy where the orientation is connected from pole to pole in an arc and large magnetic flux 6 can be produced. In recent years, in addition to them, a technology such as concentrated orientation where the magnetic flux 6 is concentrated to the center of an arc has also been proposed.

Generally, in the torque of a motor, torque characteristics improve in the order of radial anisotropy<parallel anisotropy<concentrated orientation polar anisotropic orientation. Conversely, the orientation of the present permanent magnet is diffusion orientation where the magnet flux 6 spreads in a direction of diverging toward the arc as illustrated in FIG. 5. However, the orientation on the bottom surface is parallel orientation where the orientation directions are aligned vertically relative to the surface. Such a permanent magnet is applied to the above-mentioned first to third embodiments as well as the known cases; accordingly, torque can be further increased.

Figure 6:
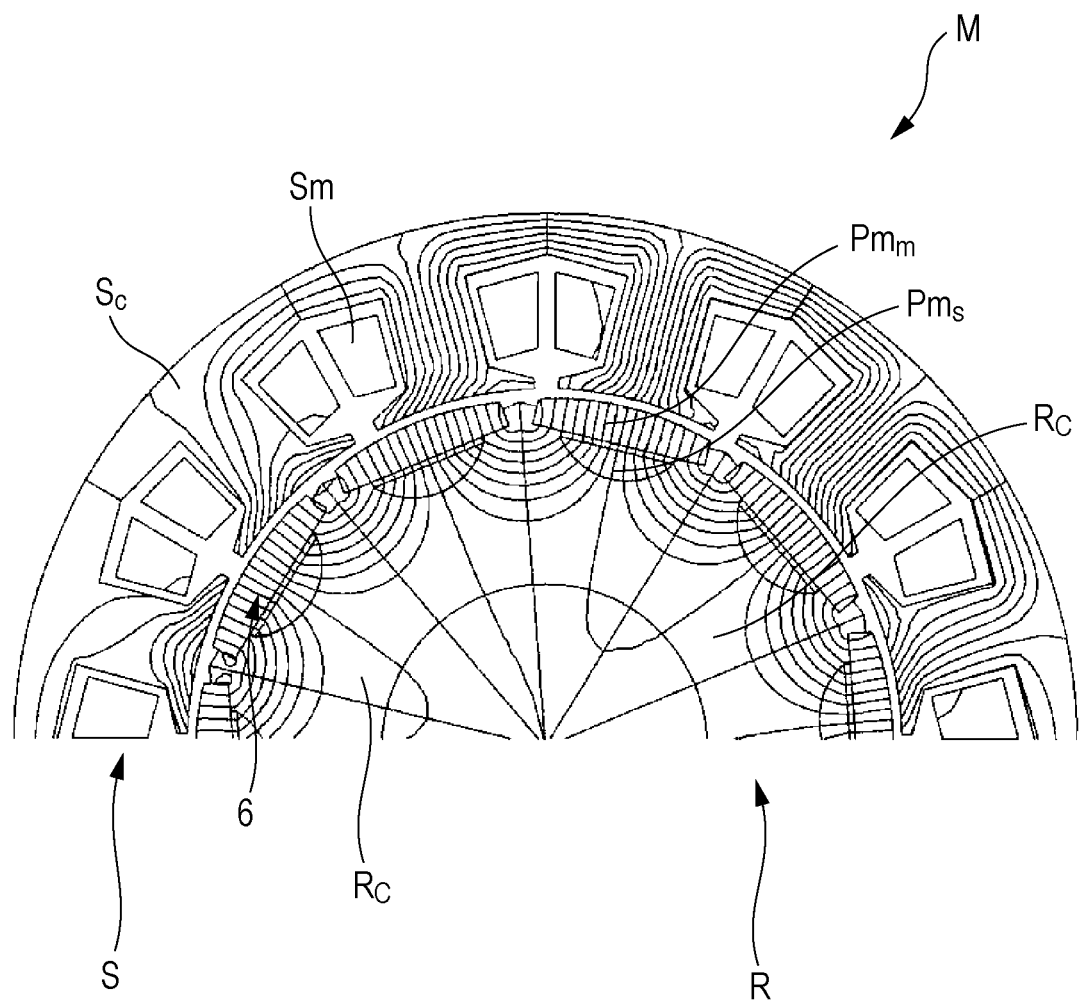
FIG. 6 is a cross-sectional view illustrating the distribution of magnetic flux of the permanent magnet illustrated in FIG. 5.

FIG. 6 illustrates the distribution of the magnetic flux 6 in a case of using such a diffusion orientation permanent magnet as the auxiliary magnet $Pm_s$ of the permanent magnet Pm of the above-mentioned first to fifth embodiments. S denotes a stator, and Sm denotes a field magnet, and Sc denotes a stator core.

As illustrated in FIG. 6, such a diffusion orientation permanent magnet is used as the auxiliary magnet $Pm_s$ of the permanent magnet Pm to produce an effect that guides the magnetic flux 6 in an arc to the auxiliary magnet $Pm_s$ of the adjacent permanent magnet Pm in the rotor R. Hence, the permanent magnet Pm including the auxiliary magnet $Pm_s$ and the main magnet $Pm_m$ can produce pseudo polar anisotropic orientation. The rotor R can generate more field magnetic flux 6 on the basis of such an effect. Accordingly, a further improvement in torque can be expected.

Advantages of Embodiments

Up to this point the embodiments of the present disclosure have been described. In summary, examples of the advantages obtained by the embodiments are as follows:

(1) It is possible to compensate the width of the permanent magnet with the permanent magnet affixed to the surface and to compensate the thickness of the permanent magnet with the permanent magnet affixed to the inner side. Hence, the degree of freedom in the shape of the permanent magnet can be increased.

(2) It is possible to design the inner permanent magnet and the outer permanent magnet in simple shapes with processing reference surfaces. Hence, the mass productivity of the permanent magnet is high.

(3) It is possible to affix the permanent magnet relative to the rotor core. Hence, the accuracy of affixation is high, and the mass productivity of the rotor is high.

(4) The outer permanent magnet may be demagnetized under the influence of magnetic flux from an armature (a reverse magnetic field). Hence, a material having a high intrinsic coercivity is selected as the material of the permanent magnet. An Nd—Fe—B-based permanent magnet including much heavy rare earth is suitable for such a material. However, the material including heavy rare earth may affect the environment. In contrast, the inner permanent magnet resists the direct influence of a reverse magnetic field. Hence, a permanent magnet with a low intrinsic coercivity can be used as the inner permanent magnet. In other words, for example, a rare earth permanent magnet without heavy rare earth, or a ferrite permanent magnet can be used as the inner permanent magnet. In this manner, the inner permanent magnet has a high degree of freedom in the selection of material. It is also possible to use different materials for the upper half and the lower half as the materials of the inner permanent magnet. In addition, the permanent magnet as a whole does not include heavy rare earth so that the total amount of rare earth can be reduced in the motor. Accordingly, the production of the permanent magnet considering the environment can be achieved.

(5) In a case of a rare earth permanent magnet, the coefficient of linear expansion is nearly zero in the radial direction. Hence, two capabilities of an adhesive force and the absorption of expansion and contraction stress are required for an adhesive between the shaft (main shaft) or rotor core and the permanent magnet. In terms of this, in a rotating machine, the length of the arc increases with increasing radius of the rotor. Hence, the expansion and contraction stress also increase in proportion to the radius. Therefore, in the inner permanent magnet, the influence of the expansion and contraction stress is reduced in proportion to the outer permanent magnet.

Furthermore, the inner permanent magnet can also be bonded and held on a side surface of the rotor core. If the outer permanent magnet is affixed (bonded) on such an inner permanent magnet, the permanent magnets are bonded together. Accordingly, a difference in linear expansion hardly occurs, and pure strength with reference only to an adhesive force can be secured.

As described above, one aspect of the present disclosure relates to a synchronous motor including a permanent magnet. In other words, one aspect of the present disclosure increases the effective value of air-gap flux density by embedding another magnet directly below a magnet of a rotor. Consequently, it is possible to obtain a rotor structure of a synchronous motor having the structure and placement of a permanent magnet that increase motor performance and increase accuracy and mass productivity.

The configurations and the like are not limited to those illustrated in the above embodiments. The illustrated configurations and the like can be modified as appropriate within the scope where the effects of the technology of the present disclosure can be exerted. In addition, the technical scope of the present disclosure also includes technologies including configurations obtained by appropriately modifying and implementing the illustrated configurations and the like and by freely selecting the illustrated components without departing from the scope of the object of the technology of the present disclosure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A rotor structure of a synchronous motor, comprising:
a stator; and
a rotatable rotor on the inner side of the stator, wherein the rotor includes:
  a rotor core fixed to a rotary shaft; and
  a permanent magnet on the outer side of the rotor core, the permanent magnet on the outer side of the rotor core includes a main magnet and an auxiliary magnet,
  the auxiliary magnet is provided in contact with the outer side of the rotor core, the main magnet is provided in contact with the outer side of the auxiliary magnet, and an outer surface side of the auxiliary magnet is provided in such a manner as to be flush with the outer surface of the rotor core.

2. The rotor structure of the synchronous motor according to claim 1, wherein the auxiliary magnets are embedded in a plurality of indentations or holes in the perimeter of the rotor core.

3. The rotor structure of the synchronous motor according to claim 1, wherein the shapes of the main magnet and the auxiliary magnet are different from each other.

4. The rotor structure of the synchronous motor according to claim 1, wherein the materials of the main magnet and the auxiliary magnet are different from each other.

5. The rotor structure of the synchronous motor according to claim 1, wherein the main magnet has a ring-shaped cross section.

6. The rotor structure of the synchronous motor according to claim 1, wherein the auxiliary magnet is a diffusion orientation magnet where magnetic flux diffuses toward a surface of an arc.

7. The rotor structure of the synchronous motor according to claim 1, wherein cross sections, which are orthogonal to an axis of the rotary shaft, of the rotor include a cross section having only the main magnet of the permanent magnet, and a cross section having both of the main magnet and the auxiliary magnet.

8. The rotor structure of the synchronous motor according to claim 1, wherein the rotor includes a plurality of steel sheets laminated in an axial direction of the rotary shaft.

\* \* \* \* \*